Jan. 19, 1932.                R. E. WILSON                1,841,691
                AUTOMOBILE OR AEROPLANE FUEL TANK BREATHER
                          Filed Nov. 29, 1929

Witness
William P. Kilroy

Inventor
Robert E. Wilson
By Bruce K. Brown

Patented Jan. 19, 1932

1,841,691

UNITED STATES PATENT OFFICE

ROBERT E. WILSON, OF CHICAGO, ILLINOIS, ASSIGNOR TO STANDARD OIL COMPANY, OF CHICAGO, ILLINOIS, A CORPORATION OF INDIANA

AUTOMOBILE OR AEROPLANE FUEL TANK BREATHER

Application filed November 29, 1929. Serial No. 410,516.

This invention relates to a breather for tanks containing dry, vaporizable materials and it pertains particularly to a breather for the gasoline tank of an aeroplane or automobile.

Heretofore a small hole in the cap on the tank inlet served as a breather or pressure equalizer. When this tank is filled, warmed, or agitated, the internal pressure increases and gases rich in gasoline vapors are expelled into the atmosphere. When the tank is emptied or cooled, moisture laden air is sucked into the tank. The cold tank causes this moisture to condense, whereupon it sinks to the bottom of the tank (due to its higher specific gravity) and eventually clogs the gasoline line or the carburetor. This is particularly dangerous in aeroplane gasoline tanks where atmospheric and temperature conditions magnify these results and where clogging of gas lines and carburetors is particularly dangerous.

The object of my invention is to provide a breather which will keep moisture out of gasoline tanks.

A further object is to provide a means for preventing the escape of gasoline vapors from tanks of this type.

A further object is to provide an improved structure for gasoline tank breathers.

Other objects will be apparent as the detailed description of my preferred embodiment proceeds.

My invention contemplates an absorbent trap comprising an upper layer of aluminum hydroxide gel, ferric hydroxide gel, fuller's earth, etc., and a lower layer of charcoal or other material for absorbing gasoline vapors. The trap is mounted over the tank and vented to the atmosphere so that incoming air will be stripped of its moisture and will carry back gasoline vapors to the inside of the tank, and outgoing air will be stripped of its gasoline vapors and will carry away moisture as it is expelled. The charcoal may be omitted in some cases and I do not limit myself to any absorbent or combinations thereof.

For a clear understanding of my invention reference is made to the accompanying drawings, illustrating a preferred embodiment, wherein—

Figure 1:
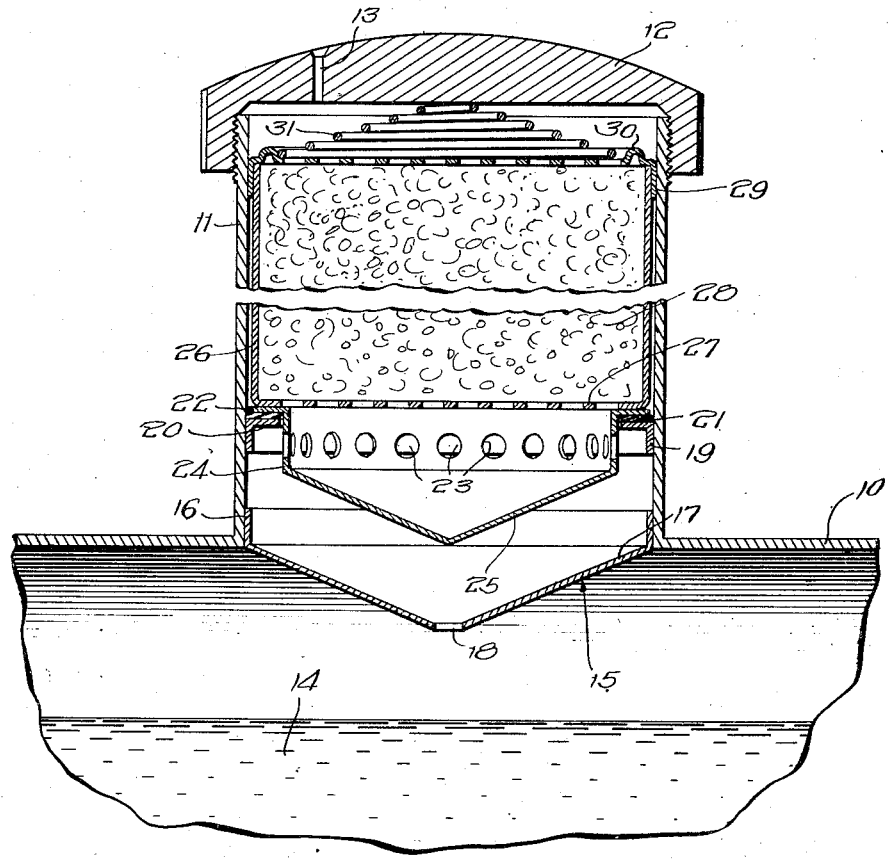
Figure 1 is a vertical section through my improved breather.
Figure 2:
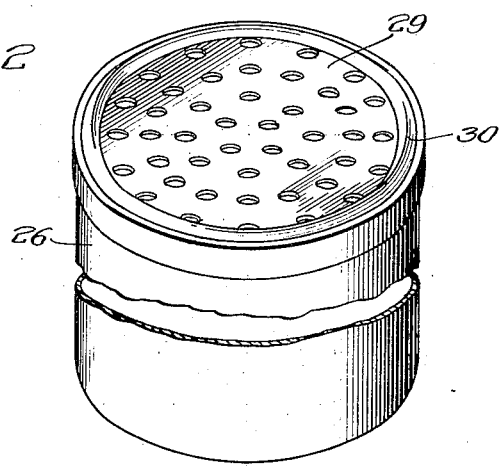
Figure 2 is a perspective of the replaceable absorbent container.

In accordance with my invention the fuel or gasoline tank of an automobile or aeroplane will be provided with a gas tight cap or cover to close the feed inlet. The tank 10 is provided with a supplemental cylindrical casing 11 on which is screwed a cap 12 provided with an aperture 13 to allow the breathing action brought about by changed conditions of temperature, pressure, etc. The cylindrical casing 11 is mounted at the top of the tank 10 so that space is left between said casing and the level of gasoline 14 in the tank. In order to prevent the gasoline from splashing into the casing, I provide a baffle 15 which may be a stamped metal disk having upturned flange 16 secured to said casing, downwardly sloping sides 17, and a small central opening 18 to permit the ingress and egress of air.

Above the baffle plate 15, I provide a supporting bracket 19 which is also secured to the inside surface of the casing and which contains an inwardly extending flange 20. A washer, preferably of leather, is placed on flange 20 to support flange 22 of a pan which has holes 23 in its vertical walls 24 and which has inclined bottom walls 25 which serve the double function of catching solid or liquid particles from the absorbent material and baffling and returning any gasoline which splashes up through the opening 18 in baffle plate 15.

A tall receptacle 26 having a perforated bottom 27 rests on flange 22. The receptacle is filled with an upper layer of granules of moisture absorbent material such as ferric hydroxide gel, silica gel, fuller's earth, etc., and a lower layer of a gasoline absorbtive material such as 8-14 mesh activated. Some absorbents, like fuller's earth, have the property of absorbing both moisture and gasoline vapors and in some cases it is not necessary to have two layers. The receptacle has a perforated cover 29 which is preferably provided with an annular shoulder 30 for positioning a tapered spiral spring 31, the upper point of which bears against the center of cover cap 12.

The operation of my improved breather will be obvious: When the tank is emptied or cooled, air will be sucked in through aperture 13, perforated top 29, absorbent material 28, perforated bottom 27, apertures 23, and opening 18, to the tank. Any moisture in the air will be absorbed by the ferric hydroxide gel or other absorbent near the top of the container. When the tank is being filled or when its temperature is increased, the current is reversed and air laden with gasoline vapors is driven through opening 18, apertures 23, and perforated bottom 22 to the absorbent material 28. The bottom portion of the absorbent material will take up the gasoline and the air freed from gasoline vapors will take up the moisture which has been deposited in the upper part of the receptacle so that the discharged air carries away moisture and not gasoline vapors. Every time the air is drawn into the tank it loses its moisture and picks up gasoline vapors and every time it leaves the tank it deposits gasoline and picks up moisture. The regeneration of the absorbent by the reversal of flow is usually incomplete and the absorbent must be replaced from time to time if it is to keep all water out of the fuel tank.

It will be seen that I have not only avoided the objectionable condensation of moisture in fuel tanks but I have provided a fuel economizer. The receptacles 26, together with absorbent material 28, may be easily removed and replaced by fresh receptacles or cartridges, and if dust, liquids or other impurities collect in pan 25, this may also be removed and cleaned.

I claim:

1. A breather for a motor fuel tank comprising an absorbent trap, absorbent material in said trap, and communications between said trap and the atmosphere and tank respectively, whereby air is stripped of its moisture as it enters the tank and is stripped of gasoline vapors as it leaves the tank, the absorbed moisture being carried away by air leaving the tank and the absorbed gasoline being returned by air entering the tank.

2. In combination, a gasoline tank having an air tight cap, a breather trap on said tank, and means in said breather trap for keeping moisture out of the tank and keeping gasoline vapors in the tank during breathing action.

3. In combination, a gasoline tank having a substantially air-tight cap on its inlet, a casing on said tank, a trap of absorbent material in said casing, and means for directing gases entering or leaving said tank through said absorbent material in said casing to prevent the loss of gasoline vapors.

4. In combination, a tank, a casing mounted on said tank, means for conducting air to and from said tank through said casing, gasoline vapor absorbent means in said casing, and baffles for preventing liquid in said tank from coming in contact with said absorbent means.

5. In a breather trap for a motor fuel tank, a receptacle, means for passing air into and out of said tank through said receptacle, means for absorbing water in said receptacle and separate means therein for absorbing gasoline vapors.

Signed this 18 day of Nov., 1929, at Chicago, county of Cook, State of Illinois.

ROBERT E. WILSON.